(12) United States Patent
Huettinger et al.

(10) Patent No.: US 10,972,017 B2
(45) Date of Patent: Apr. 6, 2021

(54) CONTROL UNIT FOR CONTROLLING AN INVERTER, INVERTER AND METHOD FOR OPERATING AN INVERTER

(71) Applicant: VALEO SIEMENS EAUTOMOTIVE GERMANY GMBH, Erlangen (DE)

(72) Inventors: Simon Huettinger, Erlangen (DE); Christian Herold, Erlangen (DE); Shan Tian, Erlangen (DE); Karsten Wiedmann, Spardorf (DE)

(73) Assignee: VALEO SIEMENS EAUTOMOTIVE GERMANY GMBH, Erlangen (DE)

( * ) Notice: Subject to any disclaimer, the term of this patent is extended or adjusted under 35 U.S.C. 154(b) by 0 days.

(21) Appl. No.: 16/209,543

(22) Filed: Dec. 4, 2018

(65) Prior Publication Data
US 2019/0173395 A1    Jun. 6, 2019

(30) Foreign Application Priority Data

Dec. 6, 2017    (EP) .................................... 17205695

(51) Int. Cl.
| | | |
|---|---|---|
| H02M 7/538 | (2007.01) | |
| H02M 7/5387 | (2007.01) | |
| H02M 1/32 | (2007.01) | |
| H02M 7/48 | (2007.01) | |
| H02P 27/06 | (2006.01) | |

(Continued)

(52) U.S. Cl.
CPC .......... *H02M 7/5387* (2013.01); *H02M 1/32* (2013.01); *H02M 7/4826* (2013.01); *H02P 27/06* (2013.01); *H02M 1/08* (2013.01); *H02M 2001/322* (2013.01); *H02P 3/22* (2013.01); *H02P 29/02* (2013.01)

(58) Field of Classification Search
CPC .... H02M 7/5387; H02M 1/32; H02M 7/4826; H02M 2001/322; H02M 1/08; H02P 27/06
See application file for complete search history.

(56) References Cited

U.S. PATENT DOCUMENTS

| | | | |
|---|---|---|---|
| 9,007,011 B2 | 4/2015 | Aoki | |
| 2011/0221374 A1* | 9/2011 | Maebara | H02M 7/53871 318/494 |
| 2015/0214858 A1* | 7/2015 | Raichle | H02M 7/537 363/131 |

FOREIGN PATENT DOCUMENTS

| | | |
|---|---|---|
| DE | 10 2016 010 740 A1 | 3/2017 |
| EP | 2 443 830 A1 | 3/2012 |

* cited by examiner

*Primary Examiner* — Adolf D Berhane
*Assistant Examiner* — Afework S Demisse
(74) *Attorney, Agent, or Firm* — Manabu Kanesaka (57) ABSTRACT

Control unit for controlling an inverter with a plurality of half bridges each having a first switching element connected to a potential of a DC link and a second switching element connected to another potential of the DC link. The control unit provides first signals to the first switching elements such that they are turned off upon receiving a request signal, and second signals to the second switching elements such that they are turned on upon receiving the request signal and to perform a comparison of a measured electric parameter of the inverter with a predefined threshold value. The control unit provides a second signal such that the second switching element controlled by the second signal is turned off for a predefined time span, if a switching criterion comprising a condition that the comparison results in that the measured electric parameter reaches or crosses the threshold value is fulfilled.

12 Claims, 3 Drawing Sheets

(51) Int. Cl.
*H02P 3/22* (2006.01)
*H02P 29/02* (2016.01)
*H02M 1/08* (2006.01)

CONTROL UNIT FOR CONTROLLING AN INVERTER, INVERTER AND METHOD FOR OPERATING AN INVERTER

RELATED APPLICATIONS

The present application is based on, and claims priority from, European Application No. 17 205 695.4 filed Dec. 6, 2017, the disclosure of which is hereby incorporated by reference herein in its entirety.

The present invention relates to a control unit for controlling an inverter with a plurality of half bridges each having a first switching element connected to a potential of a DC link and a second switching element connected to another potential of the DC link, wherein the control unit is configured to provide first signals to the first switching elements such that they are turned off upon receiving a request signal, to provide second signals to the second switching elements such that they are turned on upon receiving the request signal and to perform a comparison of a measured electric parameter of the inverter with a predefined threshold value. Aside, the invention relates to an inverter for a vehicle and a method for operating an inverter.

Inverters are widely known to convert a DC voltage provided to a DC link into an AC output current supplying stator windings of an electric machine. The inverter comprises a control unit configured to provide signals to switching elements of the inverter such that the AC output current is generated in a normal operation mode. Upon receiving a request signal, e.g. due to a failure, the control unit is switched into a failure mode. In the failure mode first switching elements connected to a potential of the DC link are turned off and switching elements connected to another potential of the DC link are turned on, thereby shortening the stator windings. Such a switching configuration is commonly named active short circuit. However, most voltage-controlled semiconductor switching elements have a normally-off characteristic. Thus, in the case of losing a power supply of the control unit or a driver unit of the inverter all switching elements are turned off permanently. It is known to use a smoothing capacitor forming the DC link to supply the control unit or the driver unit when losing the power supply. When the smoothing capacitor is discharged to or below a predefined threshold value, energy may be recovered from the electric machine in order to recharge the smoothing capacitor.

Such a control unit is known from EP 2 433 830 A1, which discloses a controller for a multiphase inverter, comprising upper switches and lower switches and a smoothing capacitor, which is arranged in a DC link, and being connected to a three-phase synchronous machine for driving a vehicle. The controller is configured to control the inverter such that electric energy from the synchronous machine is recovered during a safe state caused by an active short circuit due to closing all upper switches or all lower switches. Therein, the synchronous machine is operated in a passive generator operation by opening all switches of the inverter, wherein the smoothing capacitor is charged up to a first threshold value of a DC link voltage. Electric loads of the vehicle are supplied by electric energy of the smoothing capacitor. Above the higher second threshold value windings of the synchronous machine are short-circuited by closing all lower switches or all upper switches by the voltage of the DC link automatically. After undercutting the first threshold value the active short circuit is released by opening the closed switches automatically.

It is an object of the invention to provide an improved control unit for an inverter.

According to the invention the above object is solved by the subject matter of claim 1. Embodiments of the invention are defined by the dependent claims.

According to a first aspect of the invention a control unit as initially described is provided, which is configured to provide a second signal such that the second switching element controlled by the second signal is turned off for a predefined time span, if a switching criterion comprising a condition that the comparison results in that the measured electric parameter reaches or crosses the threshold value is fulfilled.

The control unit according to the first aspect of the invention avoids a second comparison of the measured electric parameter for deriving the time span, during which the second switching element is turned off. Instead, a fixed time span is provided. Thus, one effortful comparison requiring a fast analog measurement is omitted, advantageously. Additionally, the structure of the control unit is rendered less difficult.

The control unit according to the first aspect of the invention may comprise a timing element configured to provide the time span. The time span may be chosen such that the voltage rising during charging the smoothing capacitor is limited by accounting the maximum possible recharging current and the capacity of the smoothing capacitor. The predefined time span may be chosen between 3 µs and 10 µs.

The control unit may be configured to provide a further second signal such that a further second switching element controlled by the further second signal is turned off, if the switching criterion is fulfilled. The control unit may be configured to provide all second signals such that a further second switching element are turned off, if the switching criterion is fulfilled. The control unit may be configured to provide the other second signals such that the second switching elements controlled by the other second signals are turned on, if the switching criterion is fulfilled.

According to a second aspect of the invention a control unit as initially described is provided, which is configured to provide a second signal such that the second switching element controlled by the second signal is turned off and a second signal to another second switching element such that the second switching element is turned on, if a switching criterion comprising a condition that the comparison results in that the measured electric parameter reaches or crosses the threshold value is fulfilled.

The control unit according to the second aspect of the invention avoids turning off all second switching elements resulting in a safe pulse off operation of the inverter, which is undesired because of automotive safety requirements. These requirements often prohibit high braking torques at high rotation rates, which can be effectively avoided by keeping at least one second switching element turned on. It has been found out that turning off the switching elements of one half bridge is sufficient to provide recovered energy from stator windings of an electric machine supplied by the inverter to the smoothing capacitor. Moreover, when a single point failure occurs that causes the second switching elements controlled by the second signal to be turned off permanently, a partial active short circuit is adopted, which still fulfills the safety requirements.

The control unit according to the second aspect of the invention may be configured to provide a further second signal such that a second switching element controlled by the further second signal is turned on, if the switching criterion is fulfilled.

Furthermore, with respect to the control unit according to the second aspect of the invention the second switching element controlled by the second signal may be turned off for a predefined time span. Thus, avoiding one effortful comparison can be omitted as well.

Preferably, the threshold value is chosen below an allowed touch voltage of the inverter. The touch voltage is typically defined by 60 V. The threshold value is typically chosen between 30 V and 50 V. Preferably, the control unit is configured to avoid a rise of the DC link voltage above the touch voltage. Therein, a range between the touch voltage and the threshold voltage is wide enough to allow realistic tolerances. Typically, the request signal represents that a failure has occurred. Upon receiving the request signal the inverter and/or the control unit may be switched from a normal operation mode to a failure mode. The request signal may be generated by the control unit or may be obtained by another unit of the inverter or a controller of a vehicle comprising the inverter. In a normal operation mode of the inverter the control unit may comprise a modulation section configured to provide pulsing signals such that the switching elements are turned on and off for providing an AC output current, wherein the control unit may be configured to inhibit the pulsing signals upon receiving the request signal. Typically, the inverter comprises three or more half bridges. Advantageously, both inventive control units are functional at very low rotation and keep the braking torque at high rotation rates below a tolerable limit.

Moreover, the control unit may be configured to provide the second signal such that the second switching element is turned on for a predefined second time span after the first time span has elapsed. Therefore, the second time span may be provided by the timing element as well. The second time span may be smaller than or equal to a third of a reciprocal maximum electrical frequency being a frequency of an AC current supplied to the stator windings.

Preferably, the measured electric parameter is a voltage of the DC link. Therein, the condition may be that the comparison results in that the measured voltage reaches or falls below the threshold value. Alternatively, the measured electric parameter is a current, particularly flowing between the half bridges and the DC link.

Moreover, it is preferred that the control unit comprises a controlling section being realized discretely or by a complex programmable logic unit (CPLD) or by a field programmable gate array (FPGA) or by a microcontroller and being configured to evaluate the switching criterion and to perform the comparison based upon a low-voltage analog signal representing the measured electric parameter and being provided to the controlling section. Realizing the controlling section discretely or by the CPLD or the FPGA allows a fast and robust evaluation and comparison. Particularly, functions of the control unit may be implemented by logic gates. However, it is still possible to implement the functions by a software loaded into a microcontroller if the automotive safety requirements allow doing so.

Furthermore, the control unit may be configured to perform a second comparison of the measured electric parameter with the threshold value. Thereby, redundancies added to the evaluation of the switching criterion allowing a more robust operation of the inverter. Particularly, a higher automotive safety integrity level (ASIL) can be reached.

The control unit may comprise a comparator section for performing the second comparison being realized separately from the controlling section and being configured to provide a digital signal representing the result of the second comparison. Thus, the redundancy is realized by additional hardware means. Preferably, the comparator section is galvanically insulated from the controlling section, exemplarily by a digital optocoupler. Furthermore, the comparisons may be based on independent measurements with different measurement means.

The switching criterion may comprise an additional or alternative condition that the second comparison results in that the measured electric parameter reaches or crosses, particularly falls below, the threshold value.

Alternatively, the control unit is configured to provide a further second signal such that another switching element controlled by the further second signal is turned off if a second switching criterion comprising a condition that the second comparison results in that the measured electric parameter reaches or crosses, particularly falls below, the threshold value. In other words, each comparison is assigned to a specific second switching element. This allows to control at least one second switching element if the other second switching element has a malfunction. The control section may be configured to evaluate the second switching criterion as well.

Preferably, the switching criterion comprises or the switching criteria comprise a further condition that a low-voltage supply for the control unit and/or a driver unit of the inverter is not present. Thus, it can be ensured that the control strategy of the control unit according to the invention happens only when there is a need for recharging the smoothing capacitor. Such a need may be due to a loss of a connection to a low-voltage battery of the vehicle, particularly to connection to a terminal number 30 ("Klemme 30" according to DIN 72552).

Furthermore, the control unit may be configured to provide the first signals directly upon receiving the request signal at the signal input port and to provide the second signals after having delayed the request signal by a delay element. Such a delay ensures that all first switching elements are turned off before turning on the second switching elements after having received the request signal. Thus, a bridge short-circuit can be avoided effectively.

For normal operation of the inverter, the control unit may comprise a modulation section configured to provide pulsing signals such that the switching elements are turned on and off for providing an AC output current by the inverter, wherein the control unit may be configured to inhibit the pulsing signals upon receiving the request signal.

According to a third aspect of the invention, an inverter for a vehicle is provided, comprising a smoothing capacitor forming a DC link, a plurality of half bridges each having a first switching element connected to a potential of the DC link and a second switching element connected to another potential of the DC link, wherein the inverter comprises a control unit according to the invention.

The inverter may comprise a DC/DC-converter interconnected to convert a DC link voltage to a supply voltage for operating the control unit and/or a driver section of the inverter. Typically, the DC/DC-converter is capable of providing the supply voltage within a broad range of insulated power supply, e.g. between 30 V and 550 V. Consequently, the DC/DC-converter is able to supply the control unit and/or the driver unit down to a vehicle speed of about 10 km/h, as the recovered energy is high enough to recharge the smoothing capacitor sufficiently. Below this speed turning off all switching elements causes less braking torque than an active short circuit. Preferably, the inverter comprises a discharging section configured to discharge the smoothing capacitor below a voltage being higher than the threshold value, particularly below the touch voltage, upon receiving the request signal.

According to a fourth aspect of the invention a method for operating an inverter with a plurality of half bridges each having a first switching element connected to a potential of a DC link and a second switching element connected to another potential of the DC link is provided, wherein first signals are provided to the first switching elements such that they are turned off upon receiving a request signal, second signals are provided to the second switching elements such that they are turned on upon receiving the request signal and a comparison of a measured electric parameter of the inverter with a predefined threshold value is performed, wherein a second signal is provided such that the second switching element controlled by the second signal is turned off for a predefined time span, if a switching criterion comprising a condition that the comparison results in that the measured electric parameter reaches or crosses the threshold value is fulfilled.

According to a fifth aspect of the invention a method for operating an inverter with a plurality of half bridges each having a first switching element connected to a potential of a DC link and a second switching element connected to another potential of the DC link is provided, wherein first signals are provided to the first switching elements such that they are turned off upon receiving a request signal, second signals are provided to the second switching elements such that they are turned on upon receiving the request signal and a comparison of a measured electric parameter of the inverter with a predefined threshold value is performed, wherein a second signal is provided such that the second switching element controlled by the second signal is turned off and a second signal to another second switching element is provided such that the second switching element is turned on, if a switching criterion comprising a condition that the comparison results in that the measured electric parameter reaches or crosses the threshold value is fulfilled.

All statements referring to the inventive control units apply analogously to the inventive inverter and the inventive methods, so that the above-mentioned advantages may be achieved as well.

Further details and advantages of the invention are disclosed in the following, wherein reference is made to the schematic drawings showing.

Figure 1:
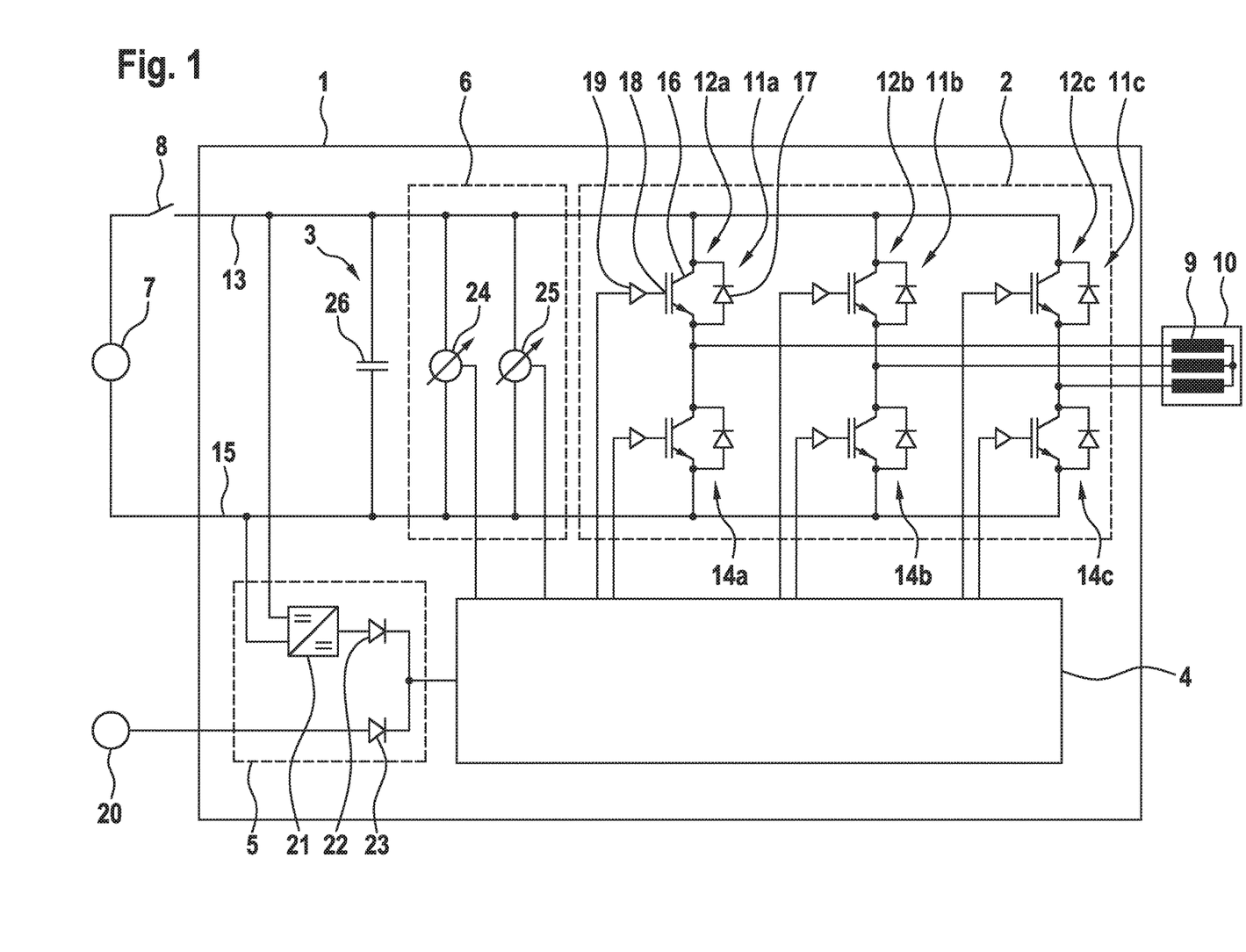
FIG. 1 a circuit diagram of a first embodiment of an inverter according to the invention.

FIG. 1 is a circuit diagram of a first embodiment of an inverter 1 comprising a power unit 2, a DC link 3, a control unit 4, a supply unit 5 and a measuring unit 6. The inverter 1 converts DC voltage provided by a high-voltage battery 7 and connected via a contactor 8 to the DC link 3 into a three-phase AC output current, which is provided by the power unit 2, being connected to stator windings 9 of an electric machine 10. The electric machine 10 is a permanent magnet synchronous motor of an electric vehicle.

The power unit 2 comprises three half bridges 11a-c each having a first switching element 12a-c connected to a first potential 13 being a high potential of the DC link 3 and a second switching element 14a-c connected to a second potential 15 being a low potential of the DC link 3. Each switching element 12a-c, 14a-c is formed by a transistor 16 and a freewheeling diode 17 connected in parallel. The transistor 16 is an insulated gate bipolar transistor. Alternatively, the transistor 16 may be a metal oxide semiconductor field-effect transistor, wherein the diode 17 is formed by a body diode of the transistor 16. A control terminal 18 of each switching element 12a-c, 14a-c is connected to a driver element 19 configured to amplify signals provided by the control unit 4. The driver elements 19 form a driver unit of the inverter 1.

The supply unit 5 obtains a supply voltage of e.g. 12 V provided by a low voltage battery 20 of the vehicle. Furthermore, the supply unit 5 comprises a DC/DC-converter 21 connected to the DC link 3. The supply unit 5 supplies an operating voltage to the control unit 4 into the driver unit, wherein the wiring between the supply unit 5 and the driver unit is not depicted for reasons of simplicity. The output of the DC/DC-converter 21 provides a voltage that is e.g. 0.5 V lower than the voltage of the low-voltage battery 20. Due to diodes 22, 23 interconnected between the output of the DC/DC-converter 21 and the low voltage battery 20 on an anode side and to the control unit 4 and the driver unit on a cathode side, the higher supply voltage of the low voltage battery 20 is dominant.

Furthermore, the measurement unit 6 comprises a first voltage measurement device 24 and a second voltage measurement device 25, which are connected in parallel to a smoothing capacitor 26 forming the DC link 3. Measured voltages by the voltage measurement devices 24, 25 are provided as measured electric parameter to the control unit 4.

Figure 2:
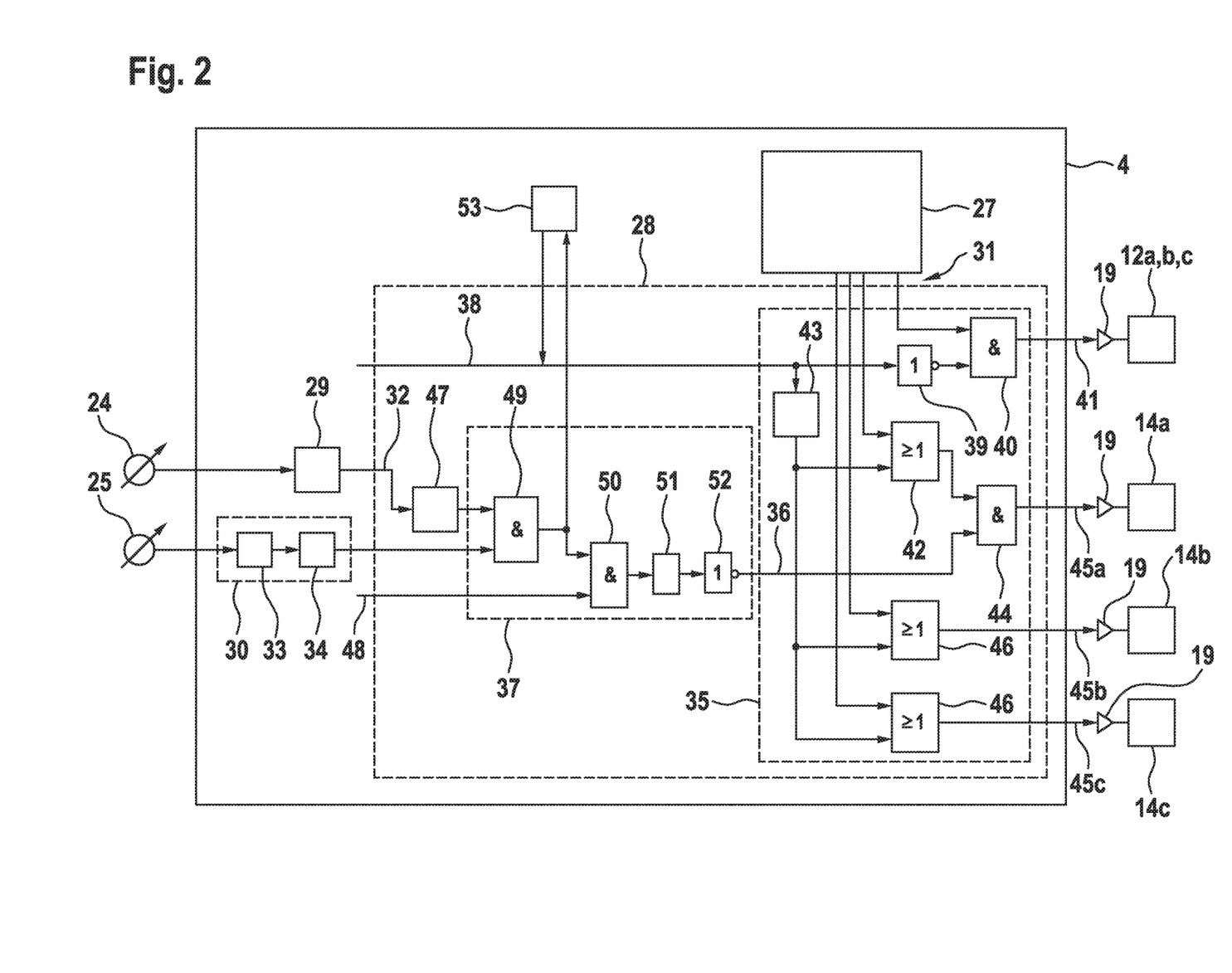
FIG. 2 a block diagram of a control unit of the first embodiment.

FIG. 2 is a block diagram of the control unit 4 of the inverter 1. The control unit 4 comprises a modulation section 27, a controlling section 28, an analog insulated amplifier section 29 and a comparator section 30.

The modulation section 27 is configured to provide pulse-width-modulated pulsing signals 31 such that the switching elements 12a-c, 14a-c are turned on and off for providing the AC output current by the inverter 1 in a normal, i.e. failure-free, operation mode. The modulation section is realized by a microcontroller having a software, which determines the pulsing signals 31. The pulsing signals 31 are provided to the controlling section 28. The modulation section 27 is part of a low-voltage side of the inverter 1.

The analog insulated amplifier section 29 receives a raw measuring signal from the first voltage measuring device 24 being part of a high-voltage side of the inverter 1 and provides an analog signal 32 representing the DC link voltage as measured electric parameter to the controlling section 28. The analog insulated amplifier section 29 forms an interface between the high-voltage side and the low-voltage side.

The comparator section 30 comprises a comparator element 33 and a digital optocoupler 34, which forms an interface between the high-voltage side and the low voltage side. The comparator element 33 receives a second measuring signal from the second voltage measuring device 25 and is part of the high-voltage side of the inverter 1.

The controlling section 28 is realized separately from the comparator section 30 discretely or by a complex programmable logic device or by a field programmable gate array. The controlling section is part of the low-voltage side of the inverter 1. The controlling section 28 comprises a first subsection 35, which obtains the pulsing signals 31 and a signal 36 from a second subsection 37. Furthermore, the first subsection 35 receives a request signal 38, which requests to adopt a safe state. The request signal 38 may be generated by the control unit 4 itself or may be received from another unit of the inverter 1 or from a controller of the vehicle.

In the normal operation mode of the inverter 1 a NOT-gate 39 of the first subsection 35 has a logic zero input signal, representing that the request signal 38 is not received. The output of the NOT-gate 39 and pulsing signals 31 for controlling the first switching elements 12a-c are the input of an AND-gate 40 for each first switching element 12a-c, wherein only one AND-gate 40 is depicted in FIG. 2 for reasons of simplicity. A first signal 41 output by each AND-gate 40 corresponds to a respective pulsing signals 31 since the NOT-gate 39 provides a logic one output as long as the request signal 38 is not received.

A pulsing signal 31 for controlling the second switching element 14a is an input of an OR-gate 42, which also has the request signal 38 being delayed by a delay element 43 as input. Thus, as long as the request signal 38 is not received and the delay time of the delay element 43 has not elapsed the OR-gate 43 outputs the pulsing signal 31. The output of the OR-gate 43 and the signal 36 are the input of an AND-gate 44. As described later on, the normal operating mode the signal 36 is a logic one. Thus, in the normal operation the second signal 45a output by the AND-gate 44 corresponds to the pulsing signal 31 for controlling the second switching element 14a.

The pulsing signals 31 for controlling the second switching elements 14b, 14c and the delayed request signal are the input of OR-gates 46. Thus, as long as the request signal 38 is not received and the delay time of the delay element 43 has not elapsed the OR-gates 46 output the pulsing signals 31. Thus, in the normal operation mode second signals 45b, 45c correspond to the pulsing signals for controlling the second switching elements 14b, 14c.

In the following the receipt of the request signal 38 being represented by a logic one, which is input into the delay element 43 and into the NOT-gate 39, is described in detail:

The control unit 4 is configured to provide the first signals 41 to the first switching elements 12a-c such that they are turned off upon receiving the request signal 38. Thus, when a logic one is fed into the NOT-gate 39, it outputs a logic zero causing the AND-gate 40 to output a logic zero as well. Accordingly, the first signals 41 cause the driver elements 19 to provide voltages to the control terminals 18 of the first switching elements 12a-c, which turn them off.

Furthermore, the control unit 4 is configured to provide the second signals 45a-c to the second switching elements 14a-c such that they are turned on upon receiving the request signal 38. With respect to the second switching element 14a the output of the OR-gate 42 is a logic one after the delay time has elapsed. As the signal 36 is still a logic one, the output of the AND-gate 44 is a logic one causing the driver element 19 to provide a voltage to the control terminal 18 of the second switching element 14a, which turns it on. With respect to the second switching elements 14b, 14c the outputs of the OR-gates 46 are a logic one after the delay time has elapsed. The outputs of the OR-gates 46 cause the driver elements 19 to provide voltages to the control terminals 18 of the second switching elements 14b, 14c, which turn them on.

By adopting the afore-mentioned switching configuration of the switching elements 12a-c, 14a-c a full active short circuit (ASC) as safe state is realized, in which the stator windings 9 of the electric machine 10 are short-circuited. Therein, the delay element 43, which has a delay time of approximately 4 μs avoids a short circuit of the half brides 11a-c.

However, a voltage supply by the supply unit 5 is necessary to keep the ASC because the switching elements 12a-c, 14a-c are normally off. Therefore, in the case of losing the supply voltage of the low voltage battery 20 an emergency voltage supply is realized by the DC/DC-converter 21, which obtains the high voltage of the DC link 3. However, due to safety measures the contactor 8 may be opened due to the same reason that triggers the request signal 38. Then the DC/DC-converter 21 cannot any longer supply the control unit 4 and the driver unit, when the smoothing capacitor 26 is discharged. Therefore, the control unit 4 allows the smoothing capacitor to be periodically recharged by a voltage recovered from the stator windings 9.

For recharging the smoothing capacitor 26, the control unit 4 is configured to provide the second signal 45a such that the second switching element 14a is turned off for a predefined first time span of 4 μs and turned on for a predefined second time span of 270 μs after the first time span has elapsed, if a switching criterion is fulfilled. By turning off the second switching element 14a, both switching elements 12a, 14a of the half bridge 11a are turned off. This results in the diodes 17 working as a rectifier, which rectifies a recovered voltage from the stator windings 9. The recovered voltage is used for recharging the smoothing capacitor 26. Note that by turning off the switching elements 12a, 14a still a partial ASC is provided as safe state.

For evaluating the switching criterion, the control unit 4, in particular the controlling section 28, is configured to perform a first comparison of the voltage by a comparator element 47 and receiving the analog signal 32 from the analog insulated amplifier section 29. The comparator element 47 is configured to perform a first comparison of the voltage of the DC link 3 represented by the analog signal 32 with a threshold value, which is chosen to 40 V. Correspondingly, the comparator element 33 of the comparator section 30 performs a second comparison of the voltage of the DC link 3 represented by the measuring signal of the second measuring device 25 with the threshold value. The result of the second comparison, which has been performed on the high-voltage side of the inverter, is then provided to the second subsection 37.

The switching criterion comprises the first condition that the first comparison results in that the voltage reaches or falls below the threshold value, the second condition that the second comparison results in that the voltage reaches or crosses the threshold value and a third condition that the low voltage supply for the control unit 4 and the driver unit by the low voltage battery 25 is not present. In order to check the third condition a signal 48 is provided, which is generated by the control unit 4 or obtained by another unit of the inverter 1 or by a controller of the vehicle.

For evaluating the switching criterion, the second subsection 37 comprises an AND-gate 49 having an output of the comparator element 47 and an output of the comparator section 30 as input. Furthermore, the second subsection 37 comprises an AND-gate 50 having the output of the AND-gate 49 and the signal 48 as input. Thus, when the switching criterion is fulfilled, the AND-gate 50 outputs a logic one.

In order to ensure that the second switching element 14a is turned off for the first time span and turned on for the second time span, the second subsection 37 comprises a timing element 51, which outputs a logic one during the first time span and outputs subsequently a logic zero during the second time span. An output of the timing element 51 is the input of a NOT-gate 52, which outputs the signal 36.

Thus, during the first time span the signal 36 is a logic zero causing the second signal 45a to be a logic zero, which causes the second switching element 14a to turn off and the inverter 1 to adopt the partial ASC. Therein, the smoothing capacitor 26 is recharged. Correspondingly, during the second time span the signal 36 is a logic one causing the second signal 45a to be a logic one, which causes the switching element 14a to turn on again and the inverter 1 to adopt the full ASC again. Therein, the smoothing capacitor is discharged by the DC/DC-converter 21.

Optionally, the control unit 4 comprises a diagnose section 53 which obtains the output of the AND-gate 49. The diagnose section 53 is configured to evaluate, whether on a startup of the inverter 1, while the smoothing capacitor 26 is charged initially, the output of the AND-gate 49 changes from a logic zero to a logic one. Thereby, the diagnose section determines whether the measurement devices 24, 25, the comparator section 30 and the comparator element 47 work properly as the voltage of the DC link 3 rises from 0 V to the voltage of the high voltage battery 7. If the change is not detected, the diagnose section 53 provides the request signal 38 resulting in adopting the full ASC.

According to a further embodiment of an inverter 1, which corresponds to the first embodiment, the second subsection 37 comprises an OR-gate instead of the AND-gate 49.

According to a further embodiment of an inverter 1 which corresponds to any of the aforementioned embodiments, the second measuring device 25, the comparator section 30 and the AND-gate 49 are omitted. The output of the comparator element 47 is fed directly into the AND-gate 50 and optionally into the diagnose section 53.

According to a further embodiment of an inverter 1, which corresponds to any of the aforementioned embodiments, the first measuring device 24, the comparator element 47 and the AND-gate 49 are omitted. The output of the comparator section 30 is fed directly into the AND-gate 50 and optionally into the diagnose section 53.

Figure 3:
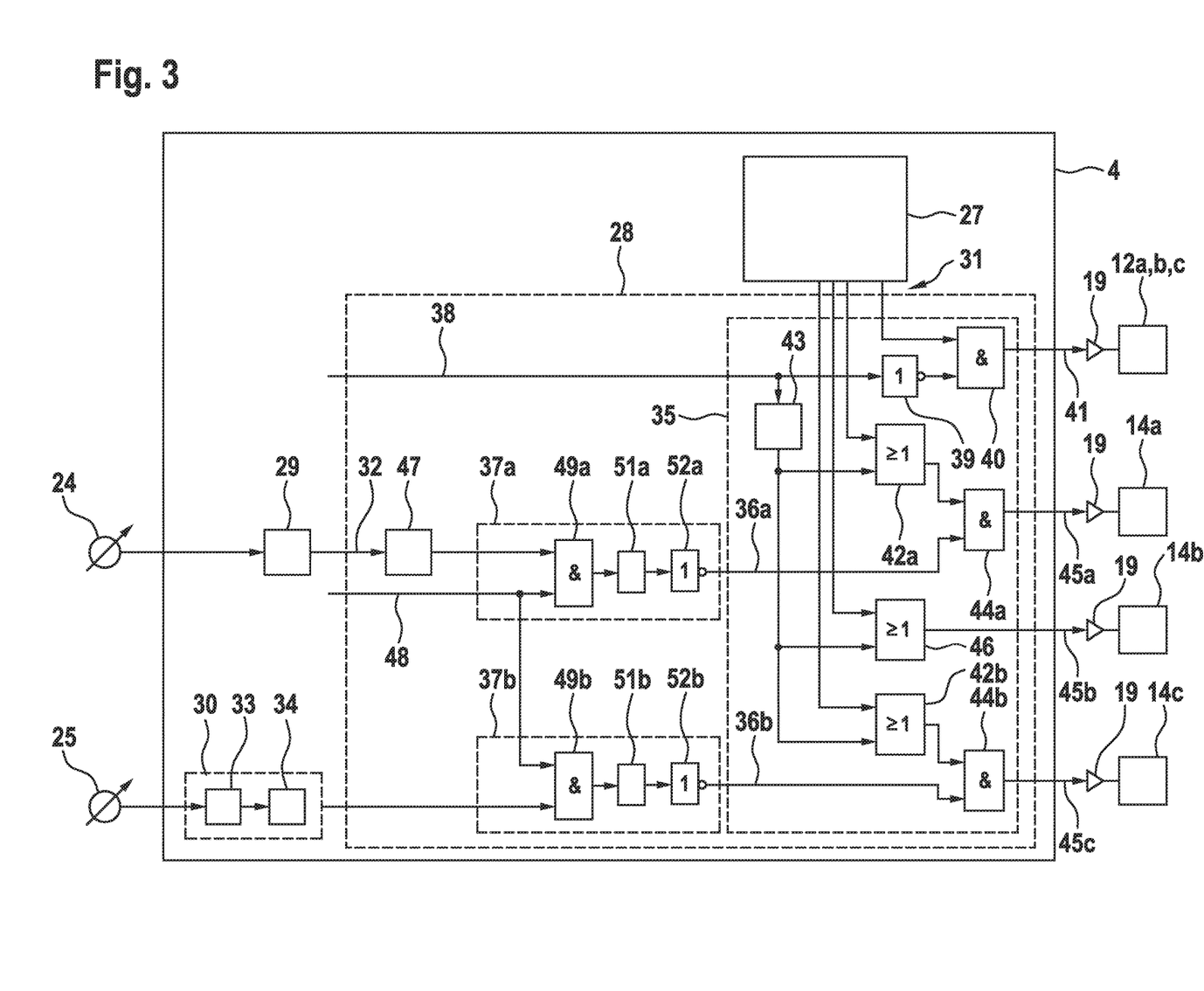
FIG. 3 a block diagram of a control unit of a second embodiment of an inverter according to the invention.

FIG. 3 is a block diagram of a control unit 4 of a further embodiment of an inverter 1, which corresponds to the first embodiment. In the following the differences in comparison to the first embodiment are described:

The second switching element 14a is controlled by a logic formed by an OR-gate 42a and an AND-gate 44a corresponding to the OR-gate 42 and the AND-gate 44 depicted in FIG. 1, wherein a second subsection provides a signal 36a, which is an input of the AND-gate 44a. In contrast to FIG. 1 the second switching element 14c is controlled by a similar logic formed by an OR-gate 42b and an AND-gate 44b, wherein a third subsection 37b provides a signal 36b, which is an input of the AND-gate 44b.

The second subsection 37a comprises only one AND-gate 49a having the output of the comparator element 47 and the signal 48 as input. A timing element 51a corresponding to the timing element 51a in FIG. 1 has the output of the AND-gate 49a as input. A NOT-gate 52a has the output of the timing element 51a as input and provides the signal 36a to the first subsection 35. Thus, the second subsection 37a is configured to evaluate a first switching criterion comprising the first condition that the first comparison results in that the voltage reaches or falls below the threshold value and the third condition that the low voltage supply for the control unit 4 and the driver unit by the low voltage battery 25 is not present. The result of the evaluation of the first switching criterion is represented by the signal 36a.

The third subsection 37b comprises an AND-gate 49b, a timing element 51b and a NOT-gate 52b corresponding to the second subsection 37a, wherein the AND-gate 49b has the output of the comparator section 30 as input instead of the input of the comparator element 47. Thus, the third subsection 37b is configured to evaluate a second switching criterion comprising a second condition that the second comparison results in that the voltage reaches of falls below the threshold value and the third condition. The result of the evaluation of the second switching criterion is represented by the signal 36b.

Thus, the inverter 1 according to the present embodiment recharges the smoothing capacitor 26 by using the half bridges 11a, 11c as rectifier when the voltage of the DC link 3 reaches of falls below the threshold value.

According to a further embodiment corresponding to the one depicted in FIG. 3 the timing elements 51a and 51b are omitted, resulting in a fast control loop.

According to a further embodiment corresponding to any of the aforementioned ones the first potential 13 is a low potential and the second potential 15 is the high potential.

According to a further embodiment corresponding to any of the aforementioned ones the measuring devices 24, 25 are configured to measure a current flowing in the DC link 3, wherein the comparisons are performed with a current threshold.

According to a further embodiment corresponding to any of the aforementioned ones, the controlling section 28 is realized by a microcontroller, wherein the logic gates, the comparator element 47, the timing elements 51, 51a, 51b and the delay element 43 are realized by corresponding software routines of a program loaded into the microcontroller.

The invention claimed is:

1. A control unit for controlling an inverter with a plurality of half bridges each having a first switching element connected to a potential of a DC link and a second switching element connected to another potential of the DC link,
wherein the control unit is configured to provide first signals to the first switching elements such that each of the first switching elements is turned off upon receiving a request signal, to provide second signals to the second switching elements such that each of the second switching elements is turned on upon receiving the request signal and to perform a comparison of a measured electric parameter of the inverter with a predefined threshold value,
the control unit is configured to provide one of the second signals such that one of the second switching elements controlled by the one of the second signals is turned off for a first predefined time span, and is turned on for a second predefined time span after the first predefined time span has elapsed, if a switching criterion comprising a condition that the comparison results in that the measured electric parameter reaches or crosses the threshold value is fulfilled,
the control unit comprises a controlling section being realized discretely or by a complex programmable logic unit or by a field programmable gate array or by a microcontroller and being configured to evaluate the switching criterion and to perform the comparison based upon a low-voltage analog signal representing the measured electric parameter and being provided to the controlling section, and
the control unit comprises a comparator section for performing a second comparison being realized separately from the controlling section and being configured to provide a digital signal representing a result of the second comparison.

2. A control unit for controlling an inverter with a plurality of half bridges each having a first switching element connected to a potential of a DC link and a second switching element connected to another potential of the DC link, wherein the control unit is configured to provide first
signals to the first switching elements such that each of
the first switching elements is turned off upon receiving
a request signal, to provide second signals to the second
switching elements such that each of the second switching elements is turned on upon receiving the request
signal and to perform a comparison of a measured
electric parameter of the inverter with a predefined
threshold value, the control unit is configured to provide one of the second
signals such that one of the second switching elements
controlled by the one of the second signals is turned off
for a first predefined time span and is turned on for a
second predefined time span after the first predefined
time span has elapsed, and to provide another of the
second signals to another of the second switching
elements such that the another of the second switching
elements controlled by the another of the second signals is turned on, if a switching criterion comprising a
condition that the comparison results in that the measured electric parameter reaches or crosses the threshold value is fulfilled, the control unit comprises a controlling section being
realized discretely or by a complex programmable logic
unit or by a field programmable gate array or by a
microcontroller and being configured to evaluate the
switching criterion and to perform the comparison
based upon a low-voltage analog signal representing
the measured electric parameter and being provided to
the controlling section, and the control unit comprises a comparator section for performing a second comparison being realized separately
from the controlling section and being configured to
provide a digital signal representing a result of the
second comparison.

3. The control unit according to claim 1, wherein the
control unit is configured to perform the second comparison
of the measured electric parameter with the threshold value.

4. The control unit according to claim 3, wherein the
switching criterion comprises an additional or alternative
condition that the second comparison results in that the
measured electric parameter reaches or crosses the threshold
value.

5. The control unit according to claim 3, wherein the
control unit is configured to further provide another of the
second signals such that another of the second switching
elements controlled by the another of the second signals is
turned off, if a second switching criterion comprising a
condition that the second comparison results in that the
measured electric parameter reaches or crosses the threshold
value is fulfilled.

6. The control unit according to claim 1, wherein the
switching criterion or the switching criteria comprise a
further condition that a low-voltage supply for the control
unit and/or a driver unit of the inverter is not present.

7. The control unit according to claim 1, wherein the
control unit is configured to provide the first signals directly
upon receiving the request signal at a signal input port and/or
to provide the second signals after having delayed the
request signal by a delay element.

8. An inverter for a vehicle, comprising:
a smoothing capacitor forming a DC link,
a plurality of half bridges each having a first switching
element connected to a potential of the DC link and a
second switching element connected to another potential of the DC link, and
the control unit according to claim 1.

9. An electric device comprising:
the inverter according to claim 8; and
an electric machine.

10. The inverter according to claim 8, further comprising:
a measurement unit including a first voltage measuring
device and a second voltage measurement device, the
first voltage measuring device and the second voltage
measuring device being connected in parallel to the
smoothing capacitor;

wherein the control unit further comprises
an analog insulated amplifier section receiving a first
measuring signal from the first voltage measuring
device and providing an analog signal representing
the DC link voltage as the measured electric parameter to the controlling section, and
the comparator section including a comparator element
receiving a second measuring signal from the second
voltage measuring device.

11. A method for operating an inverter with a plurality of
half bridges each having a first switching element connected
to a potential of a DC link and a second switching element
connected to another potential of the DC link, wherein first signals are provided to the first switching
elements such that each of the first switching elements
is turned off upon receiving a request signal, second
signals are provided to the second switching elements
such that each of the second switching elements is
turned on upon receiving the request signal and a
comparison of a measured electric parameter of the
inverter with a predefined threshold value is performed, one of the second signals is provided such that one of the
second switching elements controlled by the one of the
second signals is turned off for a first predefined time
span, and is turned on for a second predefined time span
after the first predefined time span has elapsed, if a
switching criterion comprising a condition that the
comparison results in that the measured electric parameter reaches or crosses the threshold value is fulfilled, a controlling section is realized discretely or by a complex
programmable logic unit or by a field programmable
gate array or by a microcontroller, and the switching
criterion is evaluated and the comparison is performed
based upon a low-voltage analog signal representing
the measured electric parameter and being provided to
the controlling section, and a comparator section performs a second comparison realized separately from the controlling section in the
control unit and provides a digital signal representing a
result of the second comparison.

12. A method for operating an inverter with a plurality of
half bridges each having a first switching element connected
to a potential of a DC link and a second switching element
connected to another potential of the DC link, wherein first signals are provided to the first switching
elements such that each of the first switching elements
is turned off upon receiving a request signal, second
signals are provided to the second switching elements
such that each of the second switching elements is
turned on upon receiving the request signal and a
comparison of a measured electric parameter of the
inverter with a predefined threshold value is performed, one of the second signals is provided such that one of the
second switching elements controlled by the one of the
second signals is turned off for a first predefined time
span and is turned on for a second predefined time span
after the first predefined time span has elapsed, and
another of the second signals is provided such that another of the second switching elements controlled by the another of the second signals is turned on, if a switching criterion comprising a condition that the comparison results in that the measured electric parameter reaches or crosses the threshold value is fulfilled, a controlling section is realized discretely or by a complex programmable logic unit or by a field programmable gate array or by a microcontroller, and the switching criterion is evaluated and the comparison is performed based upon a low-voltage analog signal representing the measured electric parameter, by the controlling section, and a comparator section performs a second comparison realized separately from the controlling section in the control unit and provides a digital signal representing a result of the second comparison.

* * * * *